United States Patent [19]

Oguro et al.

[11] Patent Number: 5,699,475
[45] Date of Patent: Dec. 16, 1997

[54] METHOD AND APPARATUS FOR ENCODING A DIGITAL IMAGE SIGNAL

[75] Inventors: Masaki Oguro; Naofumi Yanagihara, both of Tokyo, Japan

[73] Assignee: Sony Corporation, Tokyo, Japan

[21] Appl. No.: 12,480

[22] Filed: Feb. 2, 1993

[30] Foreign Application Priority Data

Feb. 4, 1992 [JP] Japan ................. 4-048020
Jul. 17, 1992 [JP] Japan ................. 4-213716

[51] Int. Cl.$^6$ ............... H04N 5/917; H04N 7/26
[52] U.S. Cl. ............................ 386/109; 386/112
[58] Field of Search ................. 358/335, 340, 358/342, 133, 135, 134, 136; 360/32; 386/27, 33, 34, 109, 111, 112; 348/384, 390, 395, 400, 403, 409; H04N 5/917, 7/26

[56] References Cited

U.S. PATENT DOCUMENTS

| | | |
|---|---|---|
| 5,047,852 | 9/1991 | Hanyu et al. . |
| 5,068,744 | 11/1991 | Ito ........................... 358/310 |
| 5,198,900 | 3/1993 | Tsukagoshi ................ 358/136 |
| 5,231,486 | 7/1993 | Acampora et al. ......... 358/133 |
| 5,237,424 | 8/1993 | Nishino et al. ............ 358/310 |
| 5,272,528 | 12/1993 | Juri et al. .................. 358/133 |
| 5,329,375 | 7/1994 | Juri et al. .................. 358/343 |
| 5,351,131 | 9/1994 | Nishino et al. ............ 358/335 |

FOREIGN PATENT DOCUMENTS 239076 9/1987 European Pat. Off. .
553560 8/1993 European Pat. Off. .

OTHER PUBLICATIONS

Patent Abstracts of Japan, vol. 12, No. 124, 16 Apr. 1988 & JP 62-248393.

*Primary Examiner*—Robert Chevalier
*Attorney, Agent, or Firm*—William S. Frommer; Alvin Sinderbrand

[57] ABSTRACT

A digital image signal is encoded for recording by placing in a sync block approximately an integer number of macro blocks representing orthogonally transformed image data for a certain portion of the image. When a sync block is reproduced at high speed, the reproduced data therein corresponds to a displayable portion of the image including DC components and both low and high frequency AC components. Also, each sync block contains fixed length areas for the orthogonal transform coefficient data according to the 4:1:1 (or 4:2:0) format in which four blocks of luminance coefficients and two blocks of color difference coefficients represent a certain portion of an image, and also contains at least one fixed length overflow area for the high frequency coefficients which exceed the capacity of the fixed length coefficient areas. An error in the low frequency coefficients in the fixed length areas does not harm the high frequency coefficients since they are in separately addressed areas. Before a set of macro blocks is compressed into variable length encoded data, with the amount of encoded data for each set being kept within a target value so as to fit into fixed length recording tracks, the macro blocks are shuffled so that the central portions of an image are at the beginning of the set for reducing the noticeability of errors in a reproduced image.

14 Claims, 14 Drawing Sheets

Fig. 2A
(PRIOR ART)
Fig. 2B
(PRIOR ART)
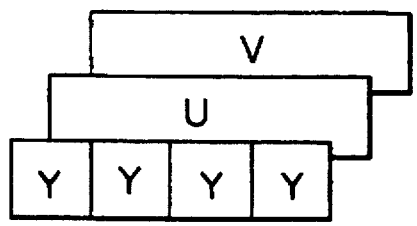
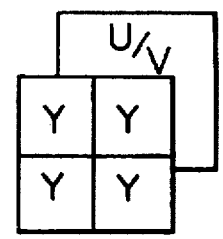
Fig. 2C
(PRIOR ART)
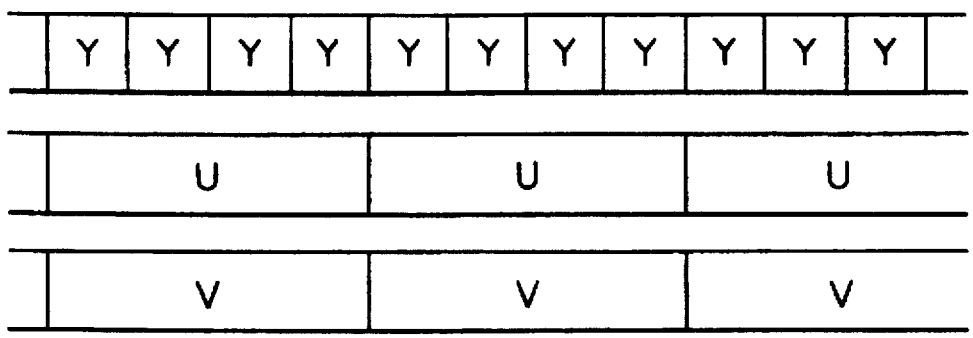
Fig. 2D
(PRIOR ART)
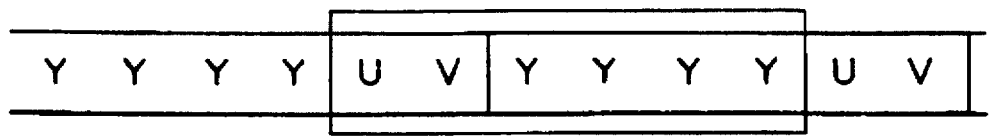

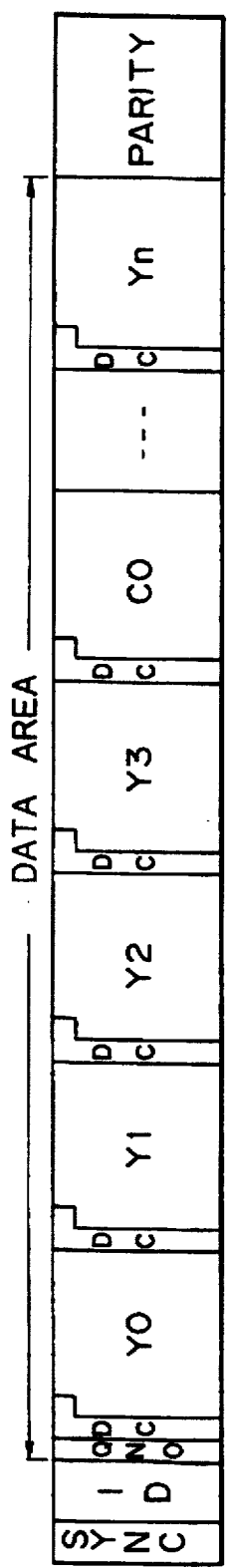
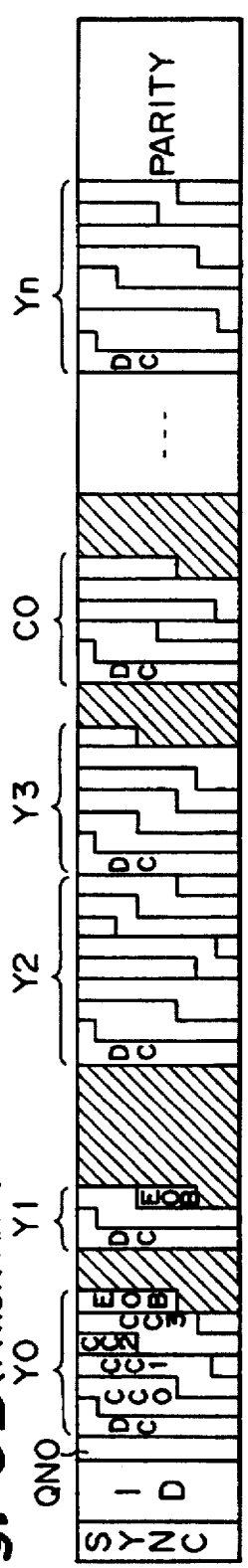
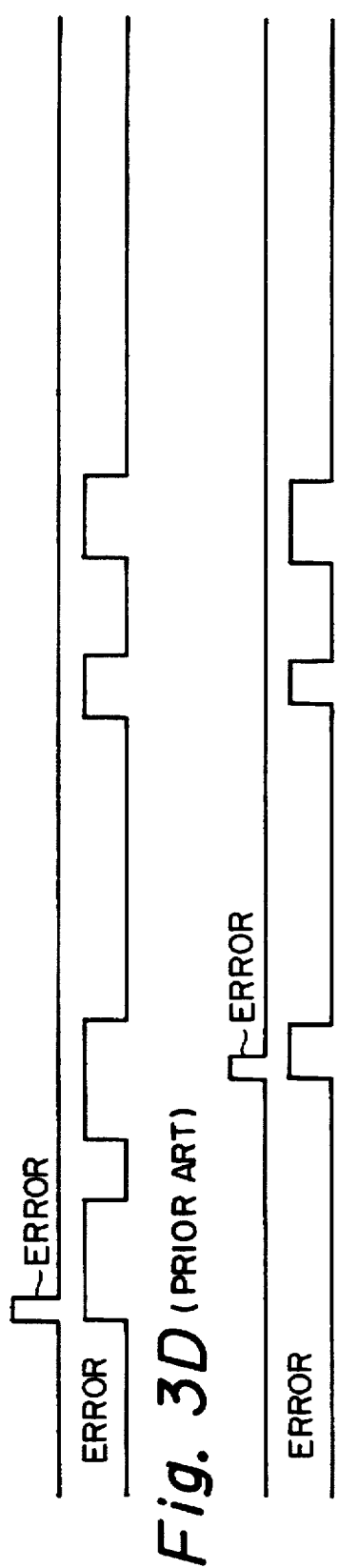
Fig. 3A (PRIOR ART)
Fig. 3B (PRIOR ART)
Fig. 3C (PRIOR ART)
Fig. 3D (PRIOR ART)

Fig. 5

| | SB1 | SB2 | SB3 | SB4 | SB5 | |
|---|---|---|---|---|---|---|
| | PARITY | PARITY | PARITY | PARITY | PARITY | |
| 2 | AC H | AC H | AC H | AC H | AC H | |
| 6 | DCT MA DATA C AC L | DCT MA DATA C AC L | DCT MA DATA C AC L | DCT MA DATA C AC L | DCT MA DATA C AC L | 18 |
| 12 | DCT MA DATA Y AC L | DCT MA DATA Y AC L | DCT MA DATA Y AC L | DCT MA DATA Y AC L | DCT MA DATA Y AC L | |
| 6 | AC H | AC H | AC H | AC H | AC H | 18 |
| 12 | DCT MA DATA Y AC L | DCT MA DATA Y AC L | DCT MA DATA Y AC L | DCT MA DATA Y AC L | DCT MA DATA Y AC L | |
| 6 | DCT MA DATA C AC L | DCT MA DATA C AC L | DCT MA DATA C AC L | DCT MA DATA C AC L | DCT MA DATA C AC L | 18 |
| 12 | DCT MA DATA Y AC L | DCT MA DATA Y AC L | DCT MA DATA Y AC L | DCT MA DATA Y AC L | DCT MA DATA Y AC L | |
| 6 | AC H | AC H | AC H | AC H | AC H | 18 |
| 12 | DCT MA DATA Y AC L | DCT MA DATA Y AC L | DCT MA DATA Y AC L | DCT MA DATA Y AC L | DCT MA DATA Y AC L | |
| 2 | AUX DATA | AUX DATA | AUX DATA | AUX DATA | AUX DATA | |
| | AUDIO | AUDIO | AUDIO | AUDIO | AUDIO | 78 |
| | ID | ID | ID | ID | ID | |
| | SYNC | SYNC | SYNC | SYNC | SYNC | 91 |

| | | | | | | | |
|---|---|---|---|---|---|---|---|
| SB1 | Y8 | Y9 | CR2 | Y10 | Y11 | CB2 | (MB2) |
| SB2 | Y4 | Y5 | CR1 | Y6 | Y7 | CB1 | (MB1) |
| SB3 | Y12 | Y13 | CB3 | Y14 | Y15 | CB3 | (MB3) |
| SB4 | Y0 | Y1 | CR0 | Y2 | Y3 | CB0 | (MB0) |
| SB5 | Y16 | Y17 | CR4 | Y18 | Y19 | CB4 | (MB4) |

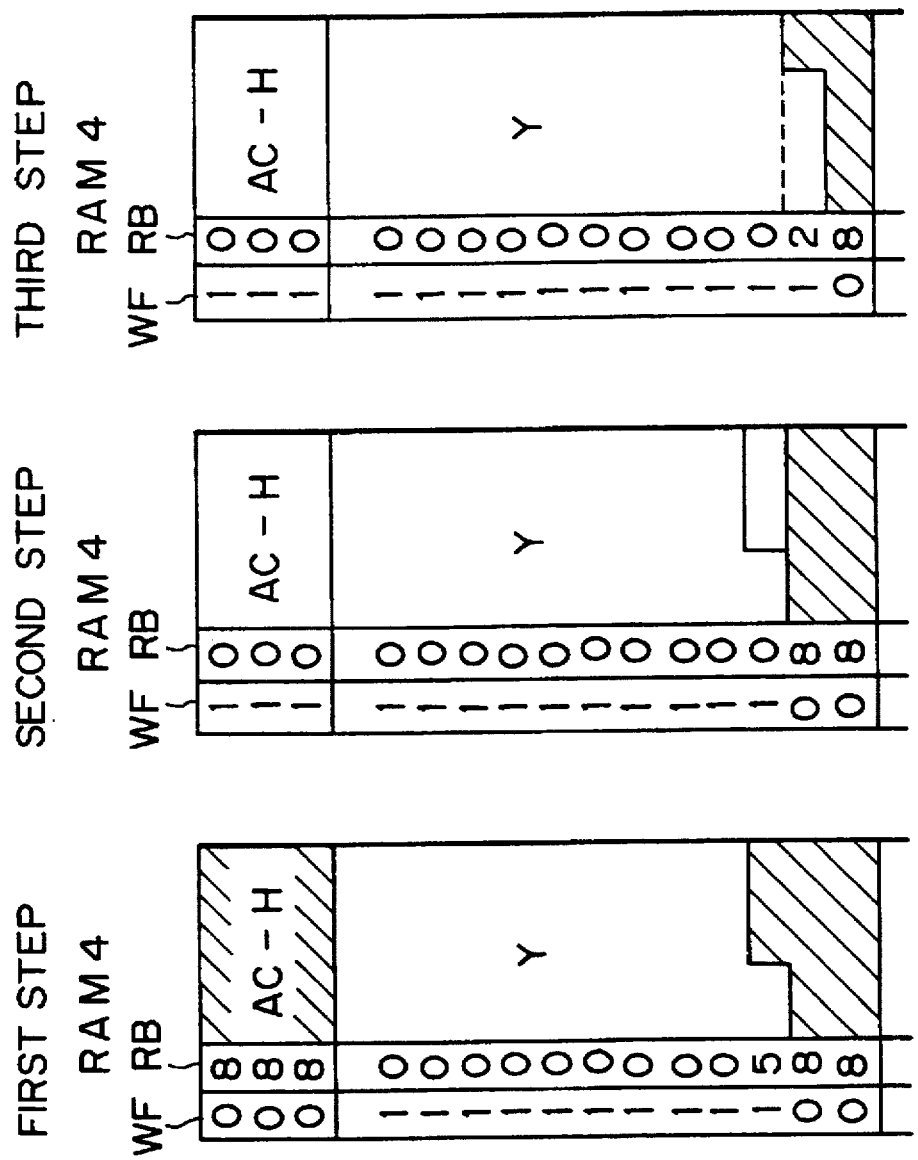

METHOD AND APPARATUS FOR ENCODING A DIGITAL IMAGE SIGNAL

BACKGROUND OF THE INVENTION

The present invention relates to encoding of a digital image signal, and more particularly relates to framing of the encoded digital image signal so as to be more readily reproducible.

Digital video tape recorders (VTRs) employ a rotary head or heads for recording a digital video signal in slant tracks on a magnetic tape. Other existing digital video recorders record in substantially circular tracks on a disk-shaped recording medium. In either case, each frame or field of the digital video signal is recorded in a plurality of tracks, and each track typically contains blocks of highly efficiently coded data which represent the image data.

A digital image signal, also referred to as a digital video signal, is typically encoded for recording by first converting the signal into blocks of image data. FIG. 1A shows a typical image data block comprised of the data for 8 pixels in 8 lines, and referred to as an (8×8) block. Each block is orthogonally transformed using, for example, a discrete cosine transform (DCT) to produce a transformed image data block or set of transform coefficients representing the image data block and consisting of one DC coefficient and many AC coefficients.

The transformed image data block is scanned in a zigzag manner, as shown in FIG. 1B, to produce a sequence of coefficients which are in a roughly ascending frequency order and which are quantized. The quantized AC coefficients, representing AC components of the image data block, are coded using a variable length code, such as, run length encoding followed by Huffman coding. The quantized DC coefficient data has a fixed length, such as nine bits. A framing circuit forms the encoded data of variable length per image data block into sync blocks of fixed length, and which each include a synchronization (sync) signal and an identification (ID) signal, so as to be more readily reproducible by a reproducing system.

When component signals (Y, U and V) are encoded via DCT, a unit referred to as a macro block is used. In the 4:1:1 system for 525/60 video signals, a macro block is comprised of four transformed image data blocks representing luminance information (YYYY), each of size 4×1, and which are arranged in a horizontal row, and two transformed image data blocks representing color difference information (U and V) and which are at the same spatial position, as shown in FIG. 2A. In the 4:2:0 system, a macro block is comprised of four transformed image data blocks representing luminance information (YYYY), each of size 2×2, and which are arranged in a square, and two transformed image data blocks representing color difference information (U and V) and which are at the-same spatial position, as shown in FIG. 2B. In other words, a macro block consists of six transformed image data or DCT blocks.

A temporal sequence of these component DCT blocks is shown in FIG. 2C, while FIG. 2D represents the temporal sequence in a more convenient form, with two macro blocks outlined. Only data which is from the same macro block can properly be combined during reproduction by the digital VTR to produce a reproduced image. Therefore, even if luminance data Y and color difference data U and V from different macro blocks are reproduced, as shown by the box in FIG. 2D, a proper image cannot be produced.

In order to ensure that the variable length encoded data fits into the fixed length sync blocks, the amount of encoded data in a particular interval is restricted to be within a target value during the encoding or buffering process. The amount of encoded data which is constrained to be within this target value is referred to as an encoding set or a buffering unit. For example, the amount of encoded data may be restricted by altering the quantization step size, possibly in accordance with a quantizing number generated by a control circuit; and the quantization step size or quantizing number is inserted into the sync block with the encoded data. FIG. 3A shows a sync block having a byte width and including a sync signal, an ID signal, a data area and a parity code area. The first item in the data area is the quantizing number QNO.

When an error occurs in the variable length encoded data or code signals, it becomes difficult to distinguish subsequent code signals, that is, the error is propagated so that the data subsequent to the error cannot be decoded. The sync block format shown in FIG. 3A has been said to be resistant to propagation errors due to the arrangement of encoded data within the data area. In particular, the data area shown in FIG. 3A has fixed length areas which contain encoded data for each of the component DCT blocks.

The encoded data or code signals DC representing the DC components are of fixed length (nine bits), whereas the encoded data or code signals AC representing the AC components are of variable length. Thus, the amounts of data in the transformed image data blocks are not necessarily equal. As shown in FIG. 3B, the AC component data for a particular transformed block are inserted into a particular fixed length area immediately following the DC component data for that particular transformed block.

If the DC and AC component data do not fill the particular fixed length area, then the area has unused capacity, shown by shading in the areas Y0, Y1, Y3 and C0. An end of block (EOB) code signal is inserted at the end of the component data for a particular transformed image data block, as shown in FIG. 3B.

If some of the AC component data of the particular transformed block does not fit into the corresponding particular fixed length area, that is, exceeds its capacity or overflows, for example, which is the case for areas Y2 and Yn in FIG. 3B, then these overflow data are sequentially inserted into unused portions of other fixed length areas starting from the beginning of the sync block.

Due to the zigzag scanning of the AC components, the overflow AC component data corresponds to relatively high frequencies. For convenience, high frequency code signals are referred to as AC-H, and the blank or unused portions of fixed length areas, shown by shading in FIG. 3B, are referred to as AC-H areas, more particularly, as variable AC-H areas, since their lengths differ depending on the image. Similarly, encoded data representing relatively low frequencies are referred to as AC-L, and the areas in which they are located are referred to as AC-L areas.

In the example shown in FIG. 3B, AC-Hs which overflowed from the area Y2 are placed in the area Y0. Of course, depending on the image, the area Y0 may be filled, and in such case the overflow from area Y2 would be placed in the first area having an unused portion, that is, a first variable AC-H area. In other situations, the transformed image data may not overflow from the area Y2, but may overflow from other areas; this overflow data would similarly be placed in the first available variable AC-H area. In short, there is no predetermined relationship between the AC-H components for each of the transformed image data blocks and the variable AC-H areas into which these AC-H components are placed.

The sync block arrangement shown in FIG. 3B prevents an error from being propagated in the DC and AC-L areas. For example, an error in a DC area renders the remaining bits of that DC area useless. However, since the starting position of the AC-L area is known, namely, the tenth bit of the fixed length area, the error in the DC area does not propagate.

Unfortunately, the AC-H areas lack resistance to errors propagated from the AC-L areas. This is a problem, because, the high frequency AC components are not reproduced, that is, if only the DC and low frequency AC components of a transformed block are reproduced, the displayed image exhibits a mosaic-like distortion.

For example, when an error occurs in the variable length encoded data CC1 shown in the AC-L area of area Y0 of FIG. 3B, the EOB code in that AC-L area cannot be detected, and so the position of the variable AC-H area in area Y0 cannot be determined. In fact, all of the variable AC-H areas in the sync block which are subsequent to the variable AC-H area having an error are also rendered useless by error propagation, as shown in FIGS. 3C and 3D.

Since there is no predetermined relationship between the AC-H components and AC-H areas, in a variable speed reproducing mode in which data is reproduced at a higher speed than in a recording mode, code signals of the variable AC-H areas cannot be used, and therefore the resultant reproduced image exhibits mosaic-like distortion. This is because each sync block of reproduced data is treated as valid data, and successive sync blocks cannot always be obtained as valid data. In other words, high speed reproduction of sync blocks having the structure shown in FIG. 3A results in reproduction of usable DC and low frequency AC components, but fails to effectively reproduce high frequency AC components.

Furthermore, in the sync block shown in FIG. 3A, there is no predetermined relationship between a macro block and a sync block. Thus, even if all code signals of one sync block are properly reproduced, it may still be impossible to properly reproduce a macro block. This is a problem when reproducing at a variable speed.

OBJECTS AND SUMMARY OF THE INVENTION

An object of the present invention is to provide a method and apparatus for encoding a digital image signal which avoid the aforementioned disadvantages of the prior art.

More specifically, it is an object of the present invention to encode a digital image signal so that a macro block of component data may be reproduced at a variable speed.

Another object of the present invention is to encode a digital image signal so as to minimize the occurrence of propagation errors.

A further object of the present invention is to encode a digital image signal to promote the reproducibility of high frequency AC components, as well as DC components and low frequency AC components, and to thereby minimize mosaic-like distortion in a reproduced image.

A still further object of the present invention is to encode a digital image signal so that macro blocks representing central portions of an image are less susceptible to errors than macro blocks representing less centrally located portions of the image.

According to an aspect of the present invention, a digital image signal is encoded by orthogonally transforming the same into transformed macro blocks containing DC and low frequency AC components of the digital image signal, encoding an encoding set comprised of a predetermined number of the transformed macro blocks using a variable length code into an amount of encoded data in accordance with a target amount, and forming the encoded data corresponding to an approximately integer number of transformed macro blocks into a sync block having a fixed length and also having DC component areas and low frequency AC component areas at predetermined positions, with the encoded data representing the DC and low frequency AC components being in the DC and low frequency AC component areas, respectively.

Since code signals for approximately an integer number of macro blocks are placed in one sync block, when a sync block is reproduced, at least one macro block can also be reproduced. Thus, an image reproduced at a variable or high speed exhibits a reduced amount of mosaic-like distortion.

In accordance with another aspect of the present invention, the transformed macro blocks also contain high frequency AC components of the digital image signal; the sync block also has a data area with at least one high frequency AC component area at a predetermined position located near the start of the data area; and, in the step of forming the encoded data into a sync block, at least some of the encoded data corresponding to the high frequency AC components of the approximately integer number of transformed macro blocks in the sync block are placed in the at least one high frequency AC component area.

Since at least one area for high frequency AC components is located at least at one predetermined position near the start of a data area of a sync block, there are less frequent occasions when it is necessary to position high frequency AC components in more than one sync block. This also reduces mosaic-like distortion during variable or high speed reproducing.

When there are plural areas for high frequency AC components located at predetermined positions in a sync block, the propagation distance of an error that affects the high frequency AC components is reduced.

In accordance with a further aspect of the present invention, the digital image signal is blocked into image data blocks, a predetermined number of the image data blocks form a respective shuffling set of macro blocks, and a spatial sequence of the image data blocks is shuffled before the digital image signal is orthogonally transformed. In particular, central macro blocks of each shuffling set which correspond to central portions of an image represented by the digital image signal are shuffled to precede other macro blocks of the respective shuffling set which correspond to other portions of the image that are less centrally located in the image than the central portions.

Since central macro blocks are arranged to precede other macro blocks, and since the initial areas of a sync block are least affected by errors in other areas of the sync block, the central portions of an image are less susceptible to errors than other portions of the image.

The above, and other objects, features and advantages of the present invention will be more readily apparent in the following detailed description of preferred embodiments of the present invention when read in conjunction with the accompanying drawings in which corresponding parts in the several views are identified by the same reference character.

BRIEF DESCRIPTION OF THE DRAWINGS

FIGS. 2A to 2D are schematic diagrams illustrating a prior art framing method;

FIGS. 3A to 3D are schematic diagrams showing a prior art sync block and illustrating propagation error therein;

FIG. 5 is a schematic diagram showing a set of sync blocks;

FIGS. 18A to 18C are schematic diagrams to which reference will be made in describing the operation of the framing circuit shown in FIG. 17.

DETAILED DESCRIPTION OF THE PREFERRED EMBODIMENT

According to a feature of the present invention, approximately an integer number of transformed macro blocks are placed into one sync block. In one embodiment, that integer number is one, that is, approximately one transformed macro block is placed in one sync block. The approximation arises when either the macro block exceeds the capacity of the sync block and overflow data from this macro block are placed into another sync block, or when overflow data from another sync block are placed into this sync block.

Furthermore, it is a feature of the present invention to provide the data area of a sync block with at least one fixed AC-H area, that is, an AC-H area at a predetermined position within the sync block. When encoded AC component data overflows from a particular fixed length area, the at least one fixed AC-H area at the predetermined position is filled with overflow data before using the variable AC-H areas, of variable length, in the fixed length areas containing DC and low frequency encoded AC component data.

Thus, even if an error occurs in an AC-L area of a particular fixed length area, the AC-H components located in the fixed AC-H area at the predetermined position can be properly reproduced from the sync block. In other words, a sync block according to the present invention is resistant to errors propagated from the AC-L areas.

In one embodiment of the invention, two fixed AC-H areas are at respective predetermined positions in the sync block, reducing the distance of error propagation in the AC-H areas.

In accordance with a further feature of the invention, macro blocks representing the digital image signal are shuffled before encoding so that macro blocks representing central portions of the image precede other macro blocks. Since the initial areas of a sync block are least affected by errors in other areas of the sync block, the central portions of the image are less susceptible to errors than other portions of the image.

Sync blocks according to respective embodiments of the present invention will now be described in detail with reference to FIGS. 4A to 4C, respectively.

Figure 1B:
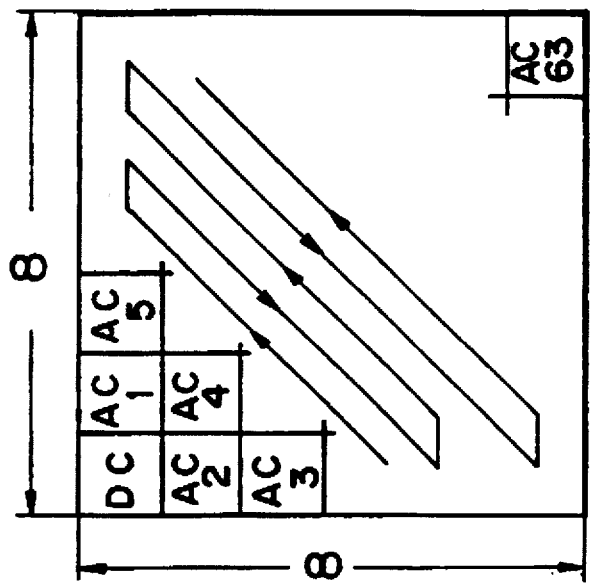
FIGS. 1A and 1B are schematic diagrams showing a block of data before and after an orthogonal transformation.
Figure 1A:
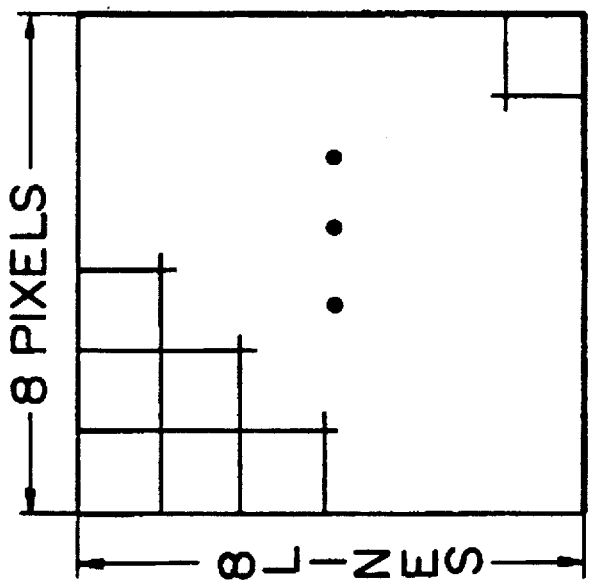
Figure 4A:
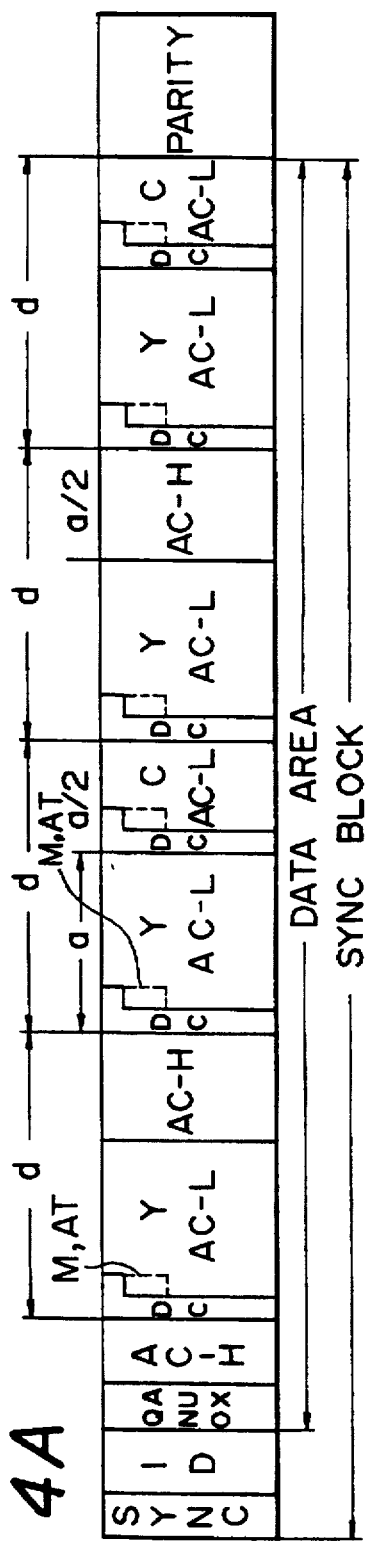
FIGS. 4A to 4C are schematic diagrams showing a sync block according to the present invention.

The sync block shown in FIG. 4A has a length of 90 bytes. At the beginning of the sync block, there is a block synchronous signal SYNC having a length of two bytes, which is followed by an ID signal having a length of three bytes and comprised of bytes ID0, ID1 and a parity code byte IDP. Of the remaining 85 bytes in the sync block, 77 bytes are used for a data area, and the last eight bytes are used for a parity code, specifically, an inner product code which is discussed further below.

The ID signal contains a frame ID, a one-bit format identification, a two-bit record data type, a sync block address, and the parity code byte IDP. The frame ID is inverted whenever a frame is changed. The identification bit distinguishes between the digital VTR format according to the present embodiment and another format such as a format of a data storage device. When the identification bit is set to "1", this bit indicates the digital VTR format according to the present embodiment. When this bit is set to "0", it indicates the other format. The record data type represents types of record data (such as video, audio, and so forth). The sync block address represents one of addresses sequentially assigned to all sync blocks which contain data of one frame and which are divided for recording in a plurality of tracks.

At the beginning of the data area, there is a quantizing number QNO followed by an auxiliary code AUX which identifies a quantizing step and each of the quantizing number QNO and the auxiliary code AUX has a length of one byte. The auxiliary code AUX in the data area is a kind of ID signal and contains a video signal broadcasting type and information such as an audio mode. The reason that the quantizing number QNO and the auxiliary code AUX are recorded in the data area is that the data in the data area is encoded with an error correction code of higher error correction capability than the error correction code used for the ID signal.

The remaining 75 bytes of the data area contain either encoded data representing a digital image signal or parity code data, specifically, an outer code which is discussed further below. In FIG. 4A, the data area is seen to contain encoded data, also referred to as code signals. The area of 75 bytes is divided into a start area having a length of three bytes, and four areas each having a length of d bytes, for example, 18 bytes.

The start area of three bytes length is a first AC-H area at a predetermined position, for example, starting at the eighth byte of the sync block.

Each area of d bytes length is divided into an area having a length of a bytes (for example, 12 bytes) and another area having a length of a/2 bytes (for example, 6 bytes). Thus, eight areas are formed having a combined length of 72 bytes.

At intervals of d bytes, that is, at the start of each of the four areas of a bytes, there are nine bits representing DC luminance component information in a respective transformed image data block, with the four transformed image data blocks (YYYY) in the sync block belonging to one macro block. After the DC luminance data DC, there are a motion flag M and an activity code AT. The motion flag M is a one-bit flag representing whether or not motion was detected in each transformed image data block. If motion was detected, the image data was orthogonally transformed in a field, whereas if motion was not detected, the image data was orthogonally transformed in a frame. The activity code AT is a two-bit code representing the activity or fineness of an image pattern. When the image pattern is fine, rough quantization of the image data is visually acceptable.

After the DC component data, the motion flag M and the activity code AT, each area of a bytes at the start of each of the four areas of d bytes contains an AC-L area for luminance information Y.

In the first and third areas of d bytes, the remaining areas of a/2 bytes length each contain a fixed AC-H area.

In the second and fourth areas of d bytes, the remaining areas of a/2 bytes length each contain a DC component for color difference information C in a transformed and encoded image data block (for example, U and V, respectively), a motion flag M, an activity code AT, and an AC-L area containing an AC component for color difference information C.

Figure 4B:
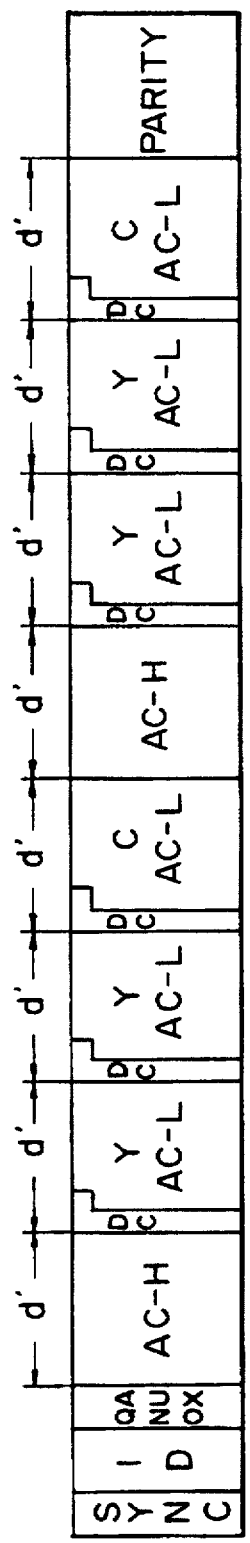

FIG. 4B shows another example of a sync block with regularity according to the present invention. At intervals of d' bytes, there are six code signal areas of transformed image data blocks and two fixed AC-H areas, totalling eight areas for containing approximately one macro block. Two additional bytes are used for the quantizing number QNO and auxiliary code AUX. Thus, in this example, the length of the data area of the sync block is (8d'+2) bytes. As in the example of FIG. 4A, at the beginning of the sync block, there is one AC-H area, followed by DC components of the transformed image data blocks positioned at predetermined intervals.

Generally, the amount of encoded data representing luminance information Y is larger than that representing color difference information C. Thus, in the data structure of FIG. 4A, the area for Y is twice as large as the area for C.

FIG. 5 shows five sync blocks SB1 to SB5 according to the present invention, each containing approximately one macro block. In one embodiment of the present invention, five macro blocks comprise a shuffling set, and five macro blocks also comprise an encoding set (also referred to as a buffering unit). These sets are discussed in detail below. The structure of each sync block in FIG. 5 is similar to that of FIG. 4A. The differences between them are that an AC-H area is located at a predetermined position at the end of the data area, and that a record area for a compressed and encoded digital audio signal is positioned at the start of the data area.

Placement of encoded data into a sync block having the structure shown in FIG. 4A, that is, formation of a sync block, will now be described with reference to FIGS. 6 and 7, which respectively show the two of the three steps employed in filling a set of five sync blocks.

In the first step of forming a sync block, encoded data representing DC and AC components of each transformed image data block belonging to the same macro block are placed into a respective one of the six DC and AC-L areas, namely, the four Y AC-L areas and the two C AC-L areas, until the respective areas are filled.

Figure 6:
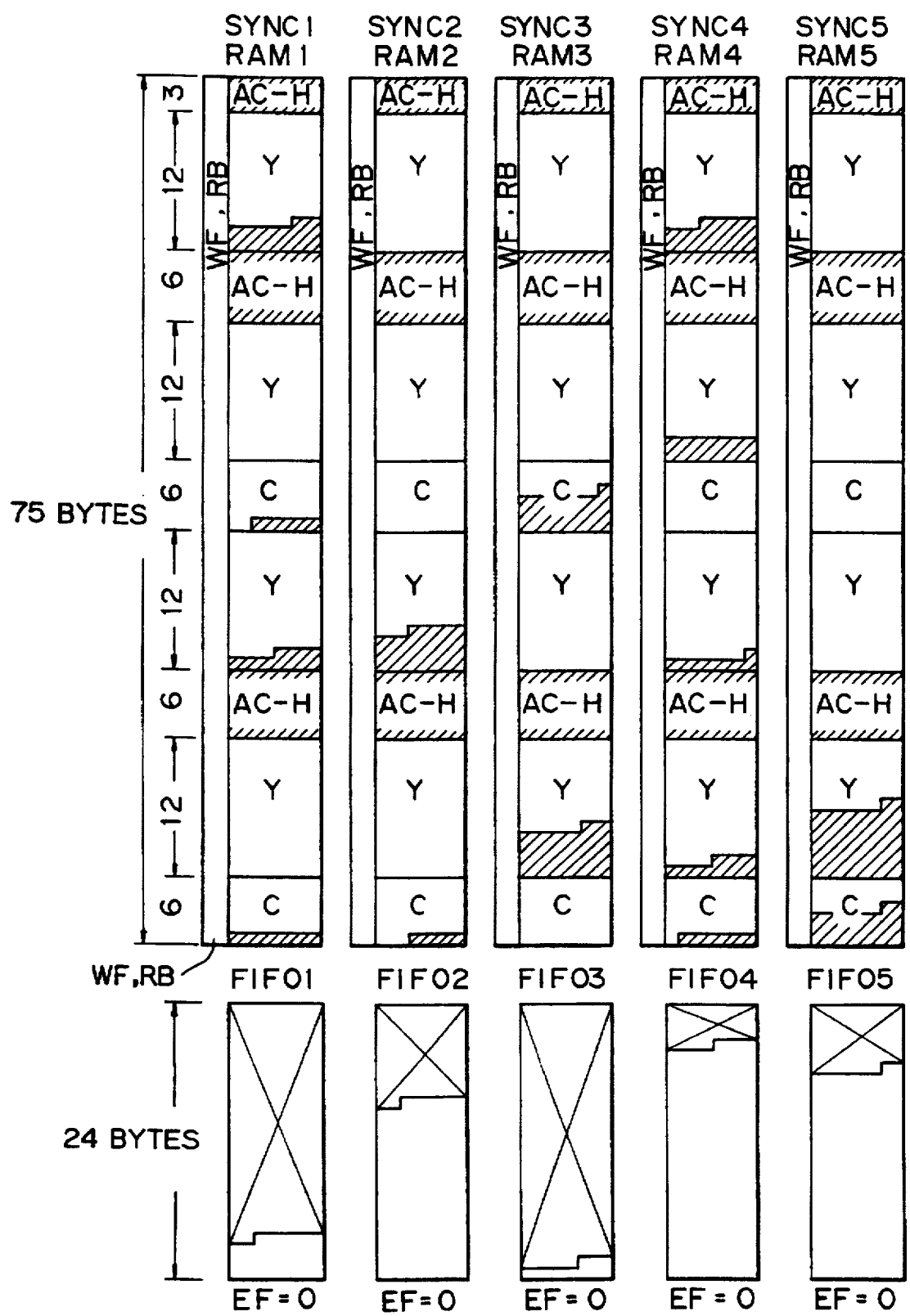
FIGS. 6 and 7 are schematic diagrams to which reference will be made in describing placement of transformed image data in a sync block according to the present invention.
Figure 7:
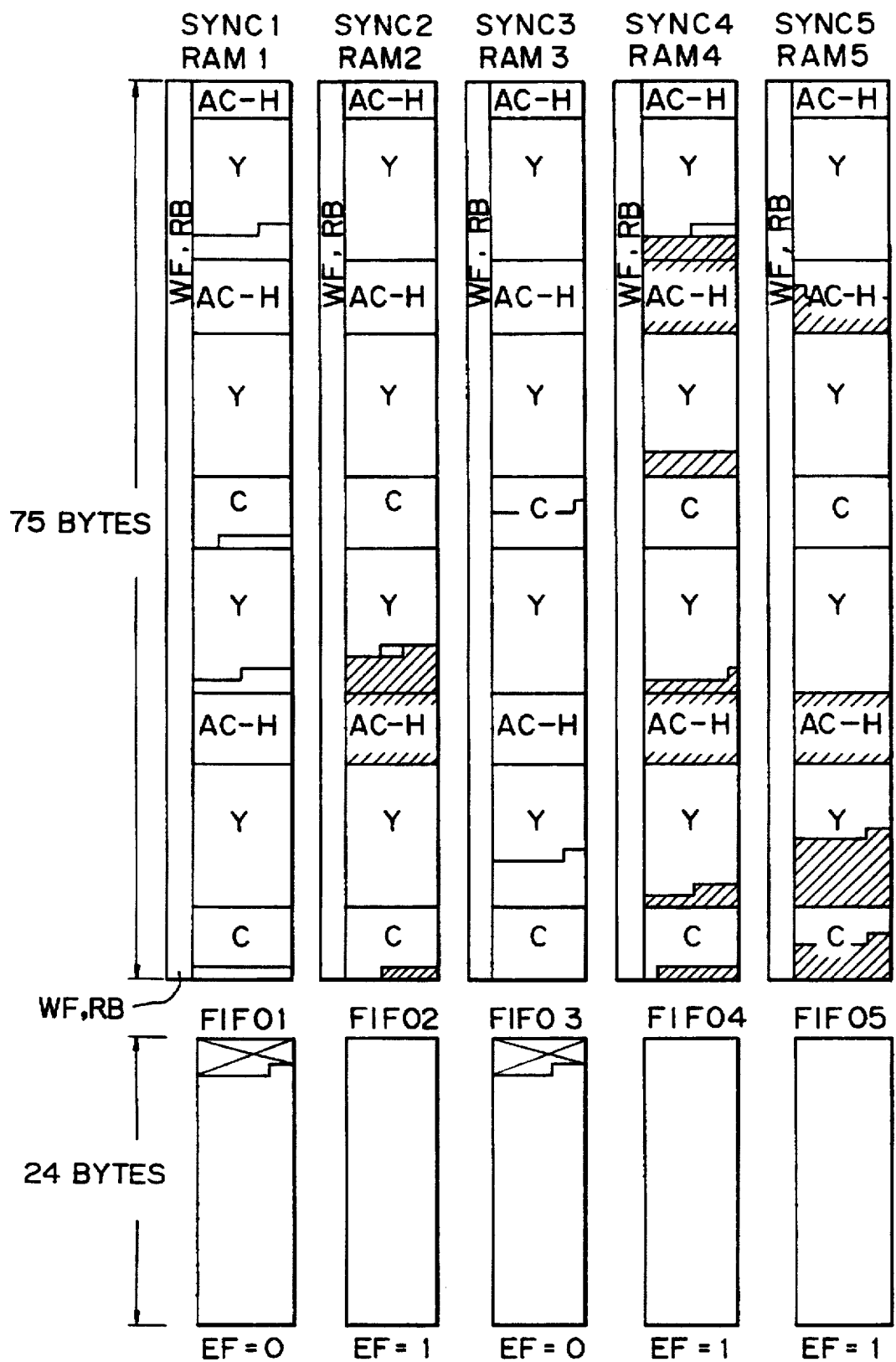

FIG. 6 shows the five sync blocks after completion of the first formation step. It is convenient to consider the sync blocks as being formed in one set of memories, referred to as RAMs 1 to 5, with blank (unfilled) areas indicated by shading. The code signals which exceed the capacity of the AC-L areas, that is, the overflow encoded data from the first step, are conveniently considered as being overflow data held in another set of memories, referred to as FIFO1 to FIFO5.

In the second step of forming a sync block, the overflow data is placed into the fixed AC-H areas and then the variable AC-H areas, that is, the unused areas of the AC-L areas, shown by shading in FIG. 6. As can be seen from FIG. 7, exactly one macro block is contained in each of the second, fourth and fifth sync blocks. However, the first and third sync blocks contain approximately one macro block, that is, they illustrate the case where the amount of encoded data for a transformed macro block exceeds the capacity of a sync block. Thus, FIFO1 and FIFO3 are shown to each contain as yet unplaced AC component data.

In the third step of forming a sync block, the as yet unplaced AC-H components are placed in blank (unfilled) areas of another sync block. For example, AC-H components which are still stored in the FIFO1 may be placed in variable AC-H areas shown by shading in the second sync block of FIG. 7, so that the second sync block would also contain approximately one macro block. The foregoing exemplifies the case where overflow data from another sync block is contained in a sync block which already contains a macro block.

Figure 8:
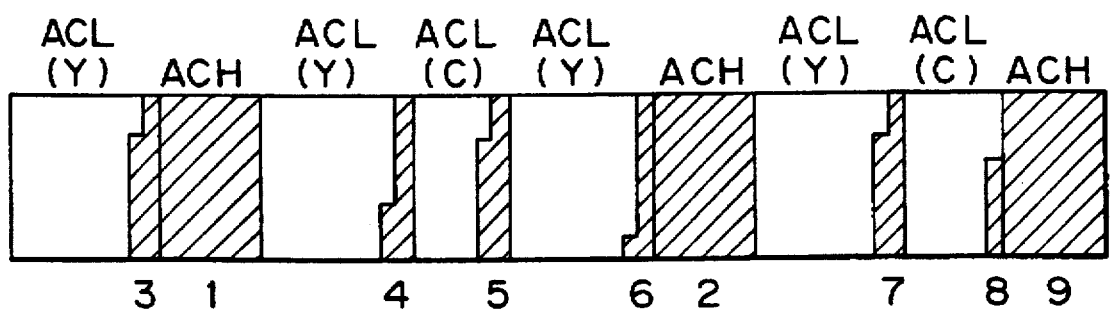
FIG. 8 is a schematic diagram illustrating a sequence in which AC-H areas are used according to the present invention.

FIG. 8 shows a sequence for placing overflow data in the AC-H areas of a sync block having the structure shown in FIG. 5. First, the AC-H areas at predetermined positions, indicated as areas 1 and 2, are filled. Then, the unfilled portions of the AC-L areas, indicated as areas 3, 4, . . . , 8, are used. Finally, the AC-H area at the predetermined position at the end of the data area, indicated as area 9, is used. In an alternative sequence, the AC-H area 9 could be used before the unfilled portions of the AC-L areas are used.

The sync block data structures of FIGS. 4A, 4B and 5, have the following first, second, third and fourth advantages:

First, since code signals of approximately one macro block are present in one sync block, in a variable speed reproducing mode or the like, data which is reproduced in the unit of one sync block can be effectively used.

Second, since there are AC-H areas which are fixed, that is, located at predetermined positions, and distributed at different positions within the sync block, occurrences of an error in AC-H components caused by a propagation error are reduced.

Third, in the structures of FIGS. 4A and 4B, a fixed AC-H area is followed by a first DC component area. Thus, AC-H components overflowed from an AC-L area are placed at the beginning of a sync block. Additional overflow data is successively placed in the next blank areas of the sync block. As a result, the probability that an AC-H component will be placed in another sync block is reduced. Specifically, there will be no occurrences of unused capacity at the start of, or anywhere else in, a sync block while overflow data from that sync block is placed into another sync block.

Fourth, since AC-H components which overflow from an AC-L area are placed beginning from a fixed AC-H area, the AC-H components have address information. Thus, even if a preceding sync block or data area has an error, it can be refreshed in, or prevented from affecting, the next sync block or data area.

Figure 4C:
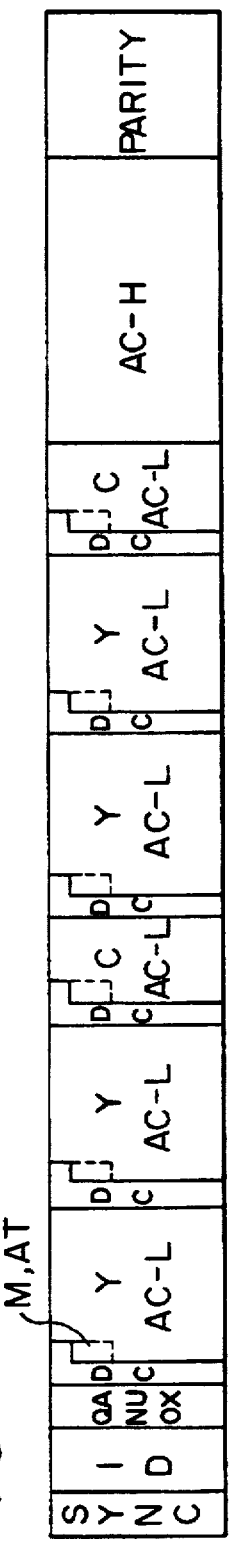

FIG. 4C shows another example of a sync block with regularity according to the present invention. Although this sync block structure has the above-mentioned first advantage, when compared with the structure shown in FIG.

4A, since an AC-H area is not divided into two portions, but positioned at the end of a relevant sync block, the above-mentioned second, third, and fourth advantages are not obtained.

A shuffling process according to the present invention will now be described.

As previously described, a macro block is comprised of a plurality of transformed image data blocks, which each include 8×8 blocks of image or coefficient data representing a digital image signal. For video data according to the 4:1:1 component system, four Y blocks in the same position of one frame, one U block, and one V block form one macro block, and may be considered as an array of 3 image blocks×2 lines. In the case of a 525/60 system such as the NTSC system, when the sampling frequency is 4 fsc (where fsc is the color subcarrier frequency), an image of one frame is comprised of 910 samples×525 lines. The effective data of this image is 720 samples×480 lines. In the above-mentioned 4:1:1 component system, the number of image data blocks in one frame is:

$$((720 \times 6/4) \times 480)/(8 \times 8) = 8100$$

Thus, the number of macro blocks in one frame is 8100/6= 1350.

Figure 9:
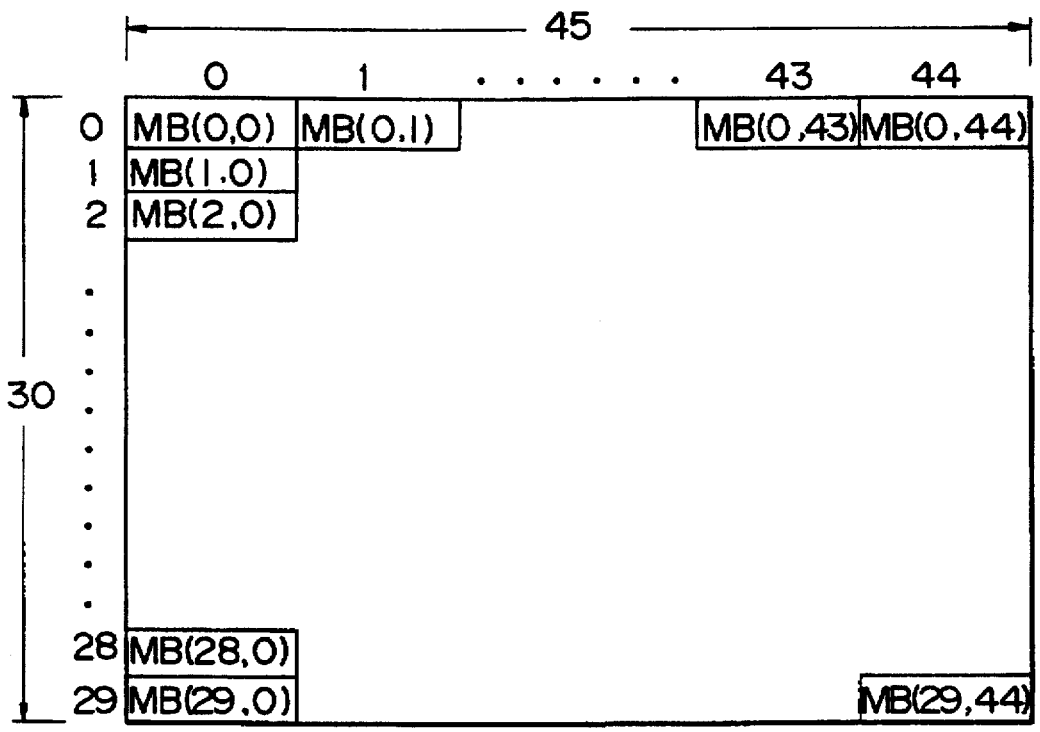
FIG. 9 is a schematic diagram showing macro blocks in a frame.

FIG. 9 shows a two-dimensional matrix of 30×45 macro blocks comprising the effective image data in one frame. Each macro block is represented by MB [i, j] (where i=0, 1, 2, . . . , 29; and j=0, 1, 2, . . . , 44). In the case of a 625/50 system such as the PAL system, one frame is represented by a two-dimensional matrix of (36×45) macro blocks. Each macro block is represented by MB [i, j] (where i=0, 1, 2, . . . , 35; and j=0, 1, 2, . . . , and 44). In accordance with the present invention, data in one frame is shuffled in macro block units, that is, all of the image data blocks in one macro block are moved together during the shuffling.

Figure 10:
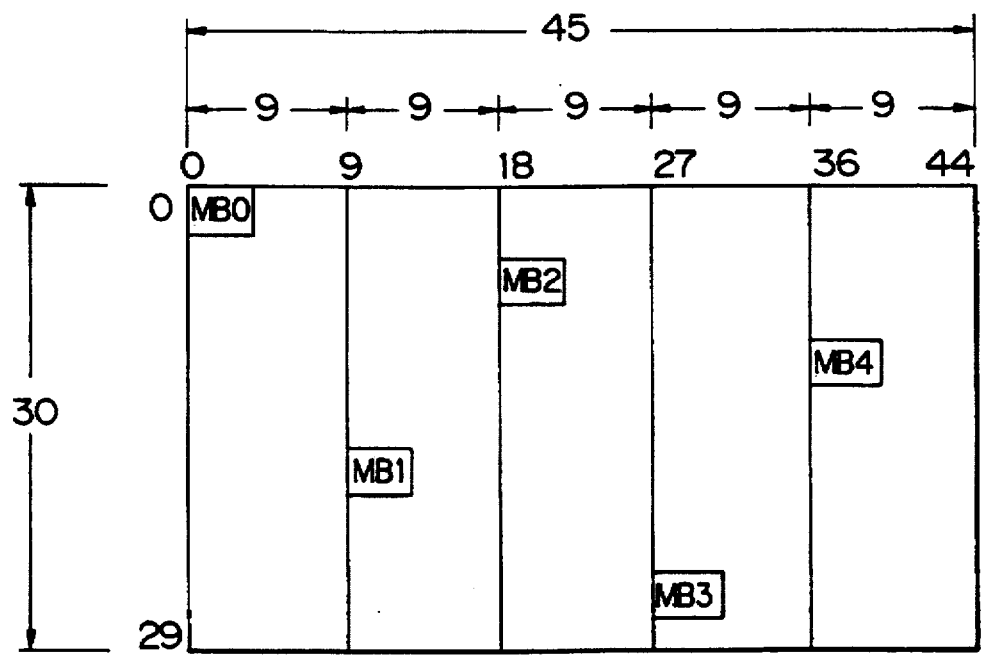
FIG. 10 is a schematic diagram illustrating shuffling.

FIG. 10 shows an example of a shuffling process according to the present invention. Macro blocks of the two-dimensional matrix are divided at intervals of nine macro blocks in the horizontal direction. Thus, five sub-areas are formed, each sub-area being three macro blocks wide. With five macro blocks selected from each sub-area in accordance with the equations presented below, one shuffling set is formed. In the present embodiment, the number of macro blocks in each shuffling set is equal to the number of macro blocks in each encoding set, and both a shuffling set and an encoding set are referred to as a buffering unit BU [m, n], where m=0 to 29 and n=0 to 8, with m based on the number of lines in a frame and n based on the number of sub-areas.

For the 525/60 system, the five macro blocks in a shuffling set BU [m, n] are determined according to the following first equation:

$$BU[m,n] = \{MB[(m) \bmod. 30, n],$$
$$MB[(m+18) \bmod. 30, n+9],$$
$$MB[(m+6) \bmod. 30, n+18],$$
$$MB[(m+24) \bmod. 30, n+27],$$
$$MB[(m+12) \bmod. 30, n+36]\}$$

For the 625/50 system (where m=0 to 35; n=0 to 8), the five macro blocks in a shuffling set are determined according to the following second equation:

$$BU[m,n] = \{MB[(m) \bmod. 36, n],$$
$$MB[(m+21) \bmod. 36, n+9],$$
$$MB[(m+6) \bmod. 36, n+18],$$
$$MB[(m+27) \bmod. 36, n+27],$$
$$MB[(m+12) \bmod. 36, n+36]\}$$

FIG. 10 shows five macro blocks comprising the shuffling set BU [0, 0] for the 525/60 system, identified as MB0 . . . MB4 to indicate the sub-area of the image from which the macro block originated. Each of the macro blocks in the shuffling set is placed substantially in a separate sync block.

As shown in FIG. 10, macro blocks MB0 and MB4 are contained in the left end and right end areas of a screen or image. A macro block MB2 is contained in the center area of the screen. Macro blocks MB1 and MB3 are contained between the left end area and the center area and between the right end area and the center area, respectively, of the screen.

The major portion of an image is normally present in the center area of a screen on which the image is displayed. In addition, audiences tend to pay more attention to the center area than to other areas. Thus, an error in the center area of the screen is more noticeable than an error in other areas, which motivates placement of the macro blocks representing central portions of an image in areas of the sync block which are least susceptible to errors.

The influence of an error in a set of sync blocks differs depending on the location of the error. For instance, when data for one macro block exceed the length of the data areas of one sync block, these overflow data are successively placed in unused areas of a subsequent sync block. When data in the one sync block has an error, the rear end of the data in the subsequent sync block cannot be distinguished and so cannot be decoded. Consequently, an error in the one sync block affects the subsequent sync block, that is, the later a sync block is in a set of sync blocks, the more this sync block can be affected by errors in other sync blocks of the set.

Figure 11:
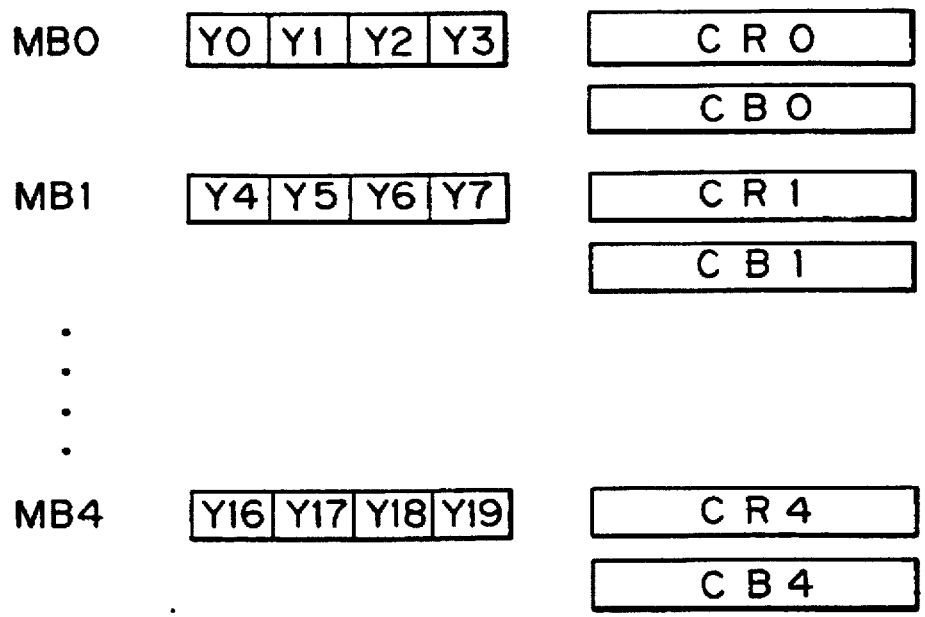
FIGS. 11 and 12 are schematic diagrams illustrating transformed image data blocks comprising a macro block.
Figures 12, 13:
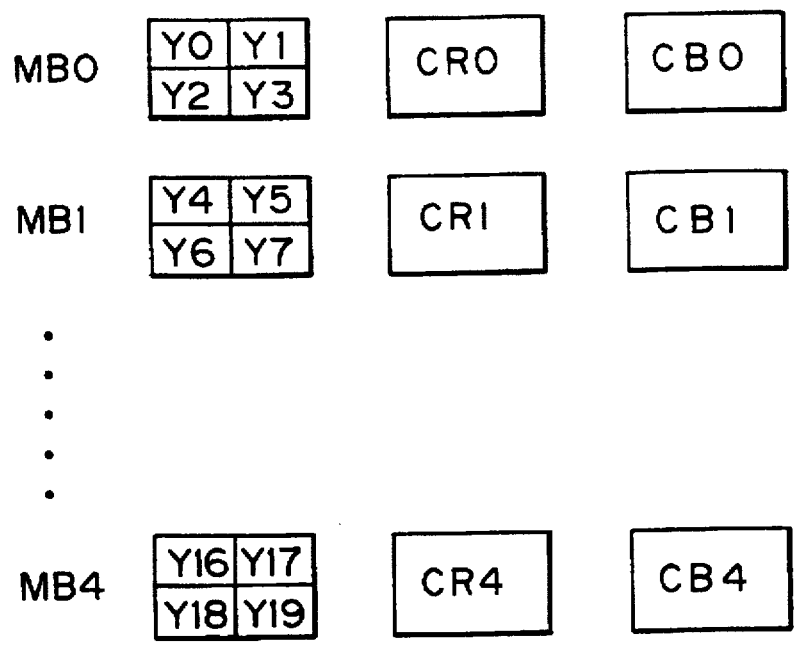
FIG. 13 is a schematic diagram showing a relationship between a plurality of sync blocks and a plurality of shuffled macro blocks.

As shown in FIG. 11, in the 525/60 system, component data of the transformed image data blocks contained in each macro block are assigned reference numerals. FIG. 12 similarly shows the reference numerals assigned to component data of the transformed image data blocks of each macro block in the 625/50 system.

As shown in FIG. 13, the macro block MB2, representing a central portion of the image, is placed in the sync block SB1 which is least affected by an error. The macro blocks MB1, MB3, MB0, and MB4 are placed in the sync blocks SB2, SB3, SB4, and SB5, respectively. With this relationship between the macro blocks and the sync blocks, the data representing central portions of the image are least affected by an error, on a probabilistic basis.

An apparatus according to the present invention will now be described in detail.

Figure 14:
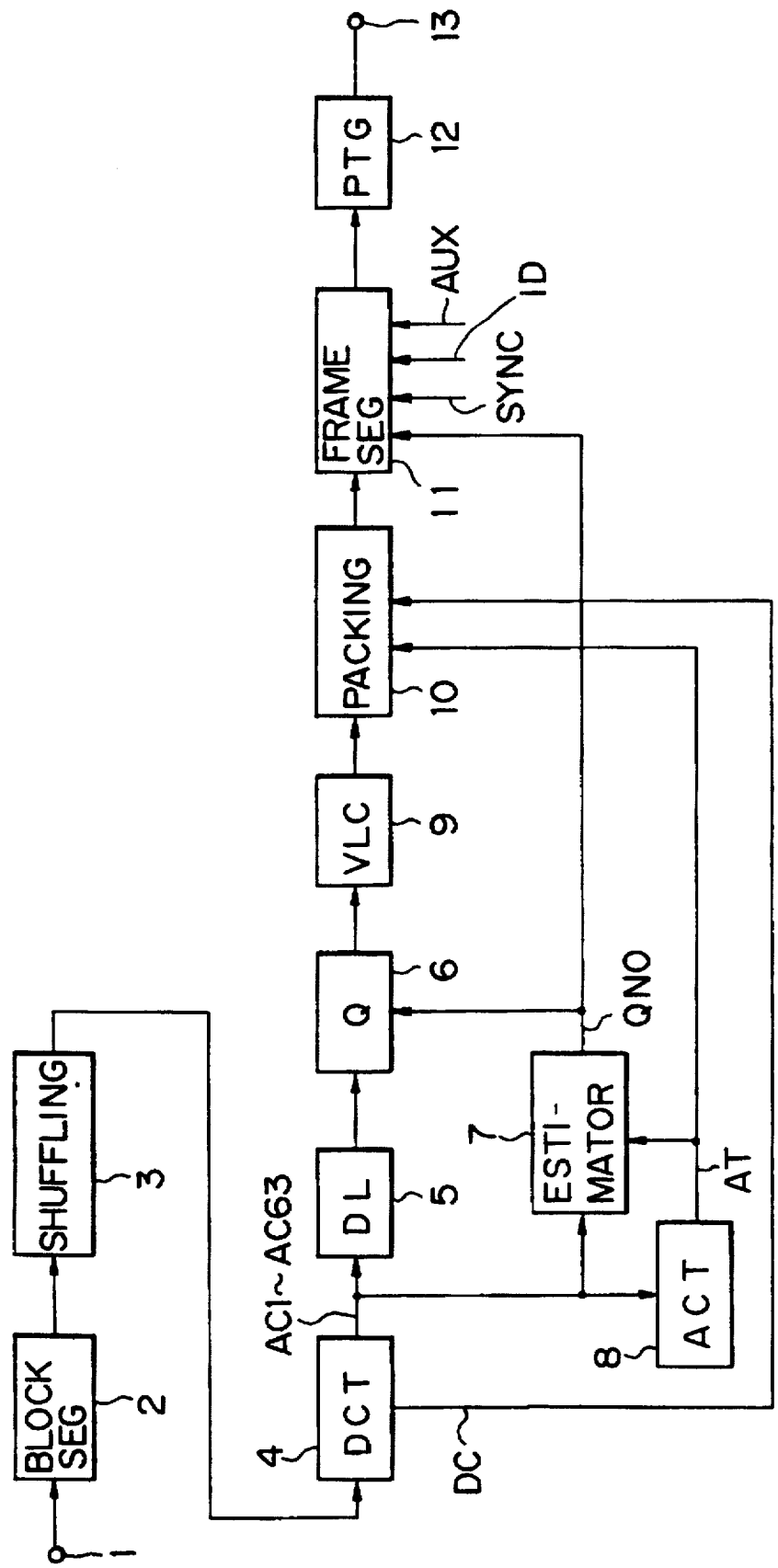
FIG. 14 is a block diagram showing a digital image signal encoding apparatus according to an embodiment of the present invention.

FIG. 14 shows an image data processing circuit according to an embodiment of the present invention provided in the recording system of a digital VTR. In FIG. 14, an input terminal 1 receives digitized video or image data. The video data is supplied to a block segmenting circuit 2 that reformats video data in a raster scanning sequence into blocks of 8×8 image data, and supplies these image data blocks to a shuffling circuit 3. The circuit 3 performs a shuffling process to change spatial positions of data of one frame in units of macro blocks, as described above, thereby to prevent image quality from being degraded due to concentration of errors.

In FIG. 14, for the sake of simplicity, a motion detecting circuit is omitted. When an image data block is orthogonally transformed, if motion is not detected, then the orthogonal transformation is performed in a relevant frame. If motion is detected, then the orthogonal transformation is performed in a relevant field.

The output of the shuffling circuit 3 is supplied to a discrete cosine transform (DCT) circuit 4, which generates coefficient data for a DC component DC and AC components AC1 to AC63. The DC component DC of the 8×8 image or coefficient data block generated in the DCT circuit 4 is supplied to a packing circuit 10. The coefficient data for the 63 AC components AC1 to AC63 are scanned from low order AC components to high order AC components in a zigzag way and then supplied to a quantizing circuit 6 through a delay circuit 5.

The AC coefficient data are also supplied to an estimator 7, which restricts the amount of data generated in an encoding set to not exceed a target value. In addition, the estimator 7 determines the smallest quantizing step which results in an amount of encoded data that does not exceed the target value based on an activity code AT, and supplies a quantizing number QNO, corresponding to the smallest quantizing step, to both the quantizing circuit 6 and the packing circuit 10. The delay circuit 5 imposes an amount of delay equivalent to the time taken by the estimator 7 to determine an appropriate quantizing number QNO.

The AC coefficient data are also supplied to an activity detecting circuit 8, which detects the amount of data representing the AC components for each transformed image data block and generates the two-bit activity code AT representing the fineness of the pictorial pattern in each transformed image data block. When the pictorial pattern is fine, even if the data are coarsely quantized, the perceived image is not noticeably deteriorated. The activity code AT is supplied to the estimator 7 and to the packing circuit 10.

The quantizing circuit 6 requantizes the AC components AC1 to AC63 of the coefficient data. In other words, the quantizing circuit 6 divides the AC coefficient data by an appropriate quantizing step and sets the quotient to an integer. The quantizing step is determined by the quantizing number QNO received from the estimator 7, for example, the quantizing circuit 6 may have a ROM which provides a quantizing step based on the quantizing number QNO.

In a digital VTR, since a process such as editing is performed in a unit of a field or frame, the amount of data per field or frame should be no greater than a target value. The amount of data generated representing an image data block which has been orthogonally transformed and variable length code encoded varies depending on a pictorial pattern of the image data block. Because of this, an encoding or buffering process is performed for restricting the amount of data generated in the encoding set, also referred to as the buffering unit, to no more than the target value which is shorter than one field interval or one frame interval. The reason the buffering unit is decreased to less than one field or frame interval is to permit simplification in construction of the encoding or buffering circuit, such as decreasing the necessary memory capacity. In this example, the encoding set or buffering unit includes five macro blocks.

The output of the quantizing circuit 6 is supplied to a variable length code encoding circuit 9 which performs variable length encoding such as run length code encoding and Huffman code encoding. For example, zero runs, that is, runs of coefficient data of value "0" and the values of coefficient data are used with a Huffman table stored in a ROM to generate a variable length code signal, also referred to as encoded data. That is, so-called two-dimensional Huffman code encoding is used.

The code signal or encoded data from the variable length code encoding circuit 9 is supplied to the packing circuit 10, which transforms the code signal into data having a width of one byte. The output of the packing circuit 10 is supplied to a framing circuit 11.

The framing circuit 11 forms data having code signals and an activity code AT which is in accordance with a particular rule, as will be described later. The framing circuit 11 adds a sync signal, a quantizing number QNO, an ID signal, and an auxiliary code AUX to the output of the packing circuit 10. The framing circuit 11 outputs data comprised of sync blocks to a parity generating circuit 12.

The parity generating circuit 12 appends error correction code data to the received data. A product code is used as the error correction code. Data in horizonal and vertical directions are encoded with a Reed Solomon code. The error correction code in the horizontal direction is referred to as an inner code, while the error correction code in the vertical direction is referred to as an outer code. Data contained in the data area of one sync block is encoded with an inner code, which generates a horizontal parity PT. A sync block may contain only a vertical parity code, instead of data. In a variable speed reproducing mode, data obtained as sync blocks is treated to be valid and corrected with the inner code.

The output of the parity generating circuit 12 is supplied to an output terminal 13 as record data. The record data is supplied to two rotating heads through channel encoding circuits and recording amplifiers and then recorded on a magnetic tape, all of which are not shown in FIG. 14 for simplicity.

Two tracks are simultaneously formed on a magnetic tape by the two rotating heads, which are adjacently disposed. In the NTSC system, data representing one frame is divided into 10 portions or segments and recorded on 10 tracks T0 to T9. A PCM audio signal is encoded with an error correction code. The resultant PCM audio signal is mixed with image data and recorded. Alternatively, the PCM audio signal may be recorded on an audio data recording section provided on one track.

Since one frame is comprised of 1350 macro blocks, and the data representing one frame is recorded on ten tracks, 135 macro blocks are recorded on each track. Since the encoding unit is five macro blocks, 27 encoding units are recorded on each track. As described in detail below, the amount of data of each encoding unit is controlled so that it does not exceed a target value Am. Thus, data for 135 macro blocks can be recorded on each fixed length track.

Figure 15:
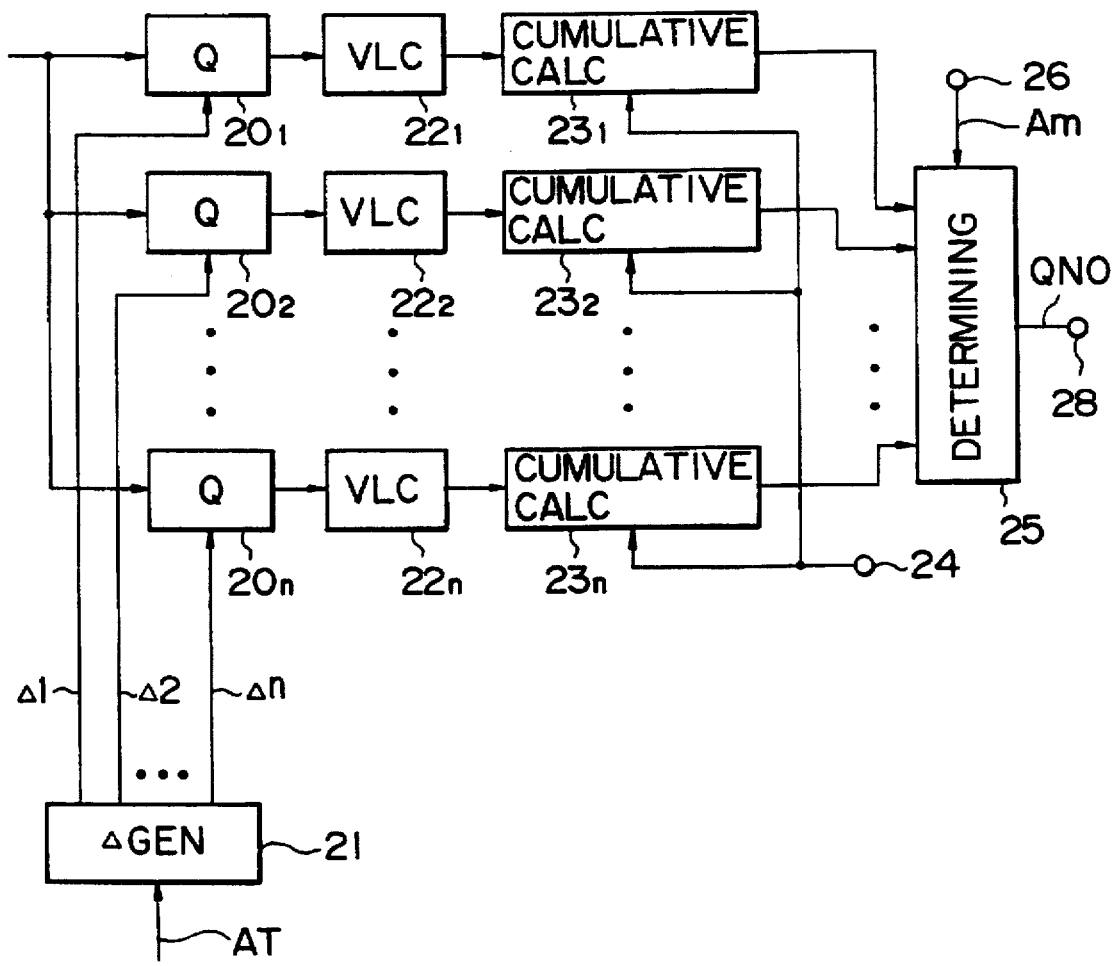
FIG. 15 is a block diagram showing an estimator used in the apparatus of FIG. 14.

FIG. 15 shows an estimator 7 which may be used in the circuit of FIG. 14. The coefficient data from the DCT circuit 4 is directed to n quantizing circuits $20_1, 20_2, \ldots, 20_n$, which also receive different quantizing steps $\Delta 1, \Delta 2, \ldots, \Delta n$ from a quantizing step generating circuit 21. The quantizing steps are in accordance with the activity code AT determined for the coefficients or transformed image data supplied to the quantizing circuits. The quantizing circuits $20_1 \ldots 20_n$ divide the transformed image data by the quantizing step respectively supplied thereto, and set the result to an integer. The thus quantized image data are supplied to a corresponding variable length code encoding circuits $22_1, 22_2, \ldots, 22_n$.

Unlike the variable length encoding circuit 9 which actually generates a variable length code, the variable length code encoding circuits $22_1 \ldots 22_n$ generate data representing the length or amount of the encoded data which would result after encoding the quantized image data with a variable length code. These length data are supplied to respective cumulative circuits $23_1, 23_2, \ldots, 23_n$, which also receive a reset pulse from a terminal 24. The cumulative circuits $23_1 \ldots 23_n$ respectively calculate the amount of encoded data generated in a encoding set, after applying the respective quantizing steps $\Delta 1 \ldots \Delta n$ to the transformed image data. In this embodiment, the reset pulse is generated at intervals of five macro blocks and is adapted to reset the cumulative circuits $23_1 \ldots 23_n$ at the start of each encoding set.

The outputs of the cumulative circuits $23_1 \ldots 23_n$ are supplied to a determining circuit 25, which receives a target value Am through a terminal 26. The determining circuit 25 compares the outputs from the cumulative circuits $23_1 \ldots 23_n$ with the target value Am and determines a quantizing step which results in the largest amount of encoded data that does not exceed the target value Am. The quantizing number QNO is based on this determination. The quantizing number QNO is supplied to an output terminal 28.

Alternatively, instead of the estimator 7 as shown in FIG. 15, the estimator 7 may be constructed to perform quantization in different quantizing steps successively. Instead of using one quantizing step for all AC coefficient data, different quantizing steps can be used for different groups of AC coefficient data. In other words, AC coefficient data may be divided into a plurality of groups according to order numbers and different quantizing steps may be prepared according to the groups. When different quantizing steps are used, a plurality of quantizing step sets are prepared according to the groups. Coefficient data is quantized using the quantizing step sets and the results are compared to determine an optimum quantizing step.

Figure 16:
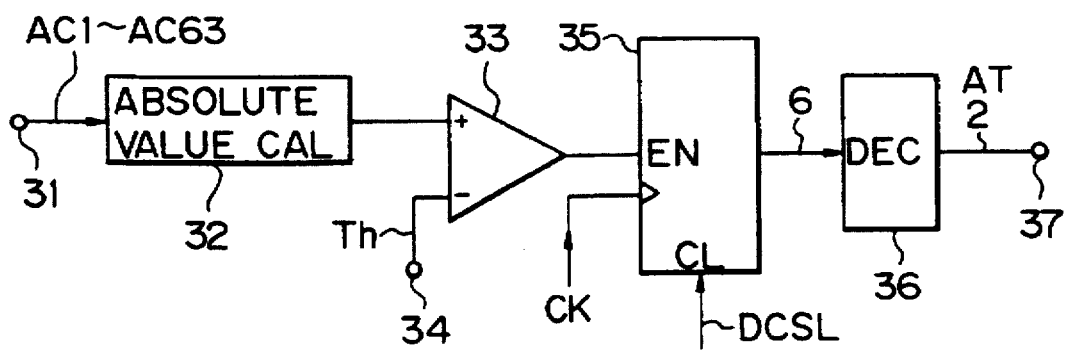
FIG. 16 is a block diagram showing an activity detecting circuit used in the apparatus of FIG. 14.

FIG. 16 shows an activity detecting circuit 8 which may be used in the circuit of FIG. 14. AC coefficient data AC1 ... AC63 are successively supplied through an input terminal 31 to an absolute value calculating circuit 32 which outputs respective absolute values to a comparing circuit 33. A threshold value Th, for example, a value of "5", is supplied through a terminal 34 to the comparing circuit 33. The comparing circuit 33 generates an output of "1" (high level) when the absolute value of the AC coefficient data is larger than the threshold value Th.

The output of the comparing circuit 33 is supplied to an enable terminal EN of a counter 35 which also receives a clock CK. A clear terminal CL of the counter 35 receives a timing signal DCSL. With the timing signal DCSL, the count value of the counter 35 is cleared at a timing of the DC component DC of each transformed image data block. Whenever AC coefficient data with an absolute value larger than the threshold value is received, the count value of the counter 35 is incremented by +1. The output from the counter 35 has a size of 6 bits and is a count value in a range from 0 to 63. The count value from the counter 35 represents an approximate amount of AC components of a relevant transformed image data block.

The count value from the counter 35 is supplied to a decoder 36 which generates the activity code AT having a length of two bits. The activity code AT is supplied through an output terminal 37 to the quantizing step generating circuit 21 of the estimator 7. For example, the decoder 36 may generate the activity code according to the following rules:

| count value of counter 35 | value of activity code AT |
|---|---|
| 0 to 10 | 00 |
| 11 to 18 | 01 |
| 19 to 25 | 10 |
| 26 to 63 | 11 |

The amount of data generated may be controlled by comparing the activity code AT for a transformed image data block with a reference activity code, for example, a code of value "01". When AT=00, indicating that the amount of AC components in the transformed image data block is small, the quantizing step should be decreased. When AT=10, indicating that the amount of AC components in the transformed image data block is large, the quantizing step should be increased. When AT=11, the quantizing step should be further increased.

Figure 17:
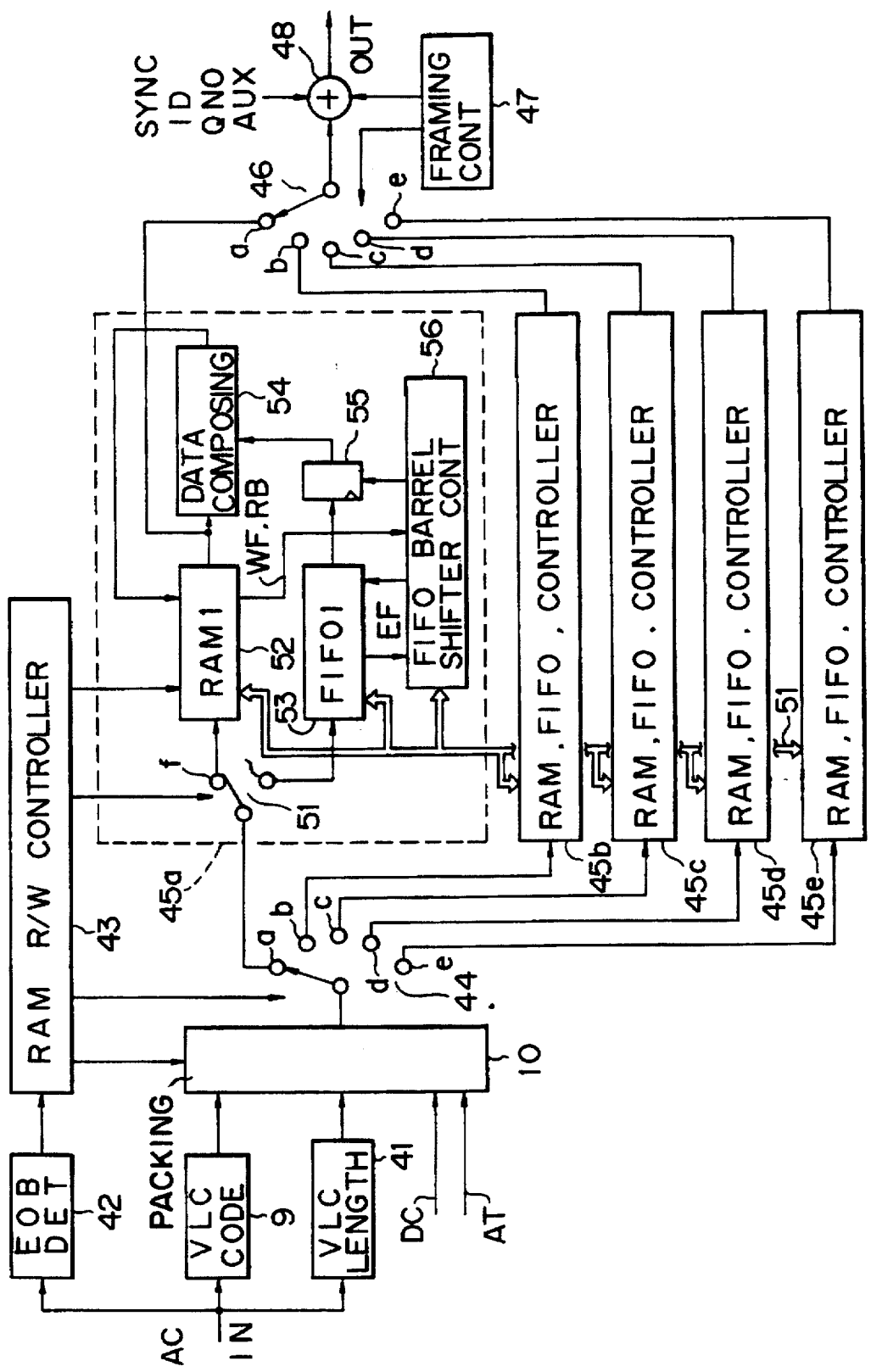
FIG. 17 is a block diagram showing a framing circuit used in the apparatus of FIG. 14.

FIG. 17 shows a framing circuit 11 which may be used in the circuit of FIG. 14. FIG. 17 also shows a packing circuit 10 preceding the framing circuit 11.

The packing circuit 10 receives encoded image data representing AC components from the variable length code encoding circuit 9, length information of the encoded image data from a variable length code encoding circuit 41, coefficient or transformed image data representing a DC component, and an activity code AT. The packing circuit 10 supplies code signals having a width of one byte to an input selector 44, for selective transmission to one of five output terminals a, b, c, d or e, and thence to one of five circuit arrangements 45a ... 45e, which respectively form data of approximately one macro block into a sync block having the structure shown in FIG. 4A, and which each have the same structure. In FIG. 17, only the structure of the circuit arrangement 45a is shown, and is seen to include a selector 51, a RAM 52, a FIFO 53, a data composing circuit 54, a barrel shifter 55, and a FIFO barrel shifter controller 56. The operation of the circuit arrangement 45a is discussed below.

An EOB detecting circuit 42 detects an EOB inserted as a delimiter of each block of encoded image data representing AC components. An output signal from the detecting circuit 42 is supplied to a RAM read/write controller 43, which supplies control signals, address signals, and timing signals to the packing circuit 10, the input selector 44, and the RAMs S2 and FIFOs S3 of circuit arrangements 45a to 45e.

The output data from the circuit arrangements 45a to 45e are supplied to input terminals a, b, c, d, and e, respectively, of an output selector 46 that is controlled by a control signal from a framing controller 47. The output of the output selector 46 is supplied to an adding circuit 48. Under control of the controller 47, the adding circuit 48 adds a synchronous signal, an ID signal, a quantizing number QNO, and an auxiliary code AUX to particular positions of a sync block. The adding circuit 48 outputs sync blocks having the structure shown in FIG. 4A.

The formation of a sync block by the circuit arrangement 45a, that is, the framing process, will now be described.

In a first step, up to a predetermined amount of the AC component signals in each encoded image data block are supplied through an output terminal f of the selector 51 to RAM 52, to be placed successively in corresponding AC-L areas of a sync block being formed in RAM 52. The AC component signals which exceed this predetermined amount are considered to be overflow data, and are supplied through an output terminal g of the selector 51 to FIFO 53.

The RAM 52 has areas for storing data of 75 bytes and flags WF and RB. The flag WF has 75 bits, each representing whether or not a respective byte of the data area has been written. When the value of a bit of the flag WF is "0" (WF="0"), it indicates that a relevant byte has not been written. When the value of a bit of the flag WF is "1" (WF="1"), it indicates that a relevant byte has been written. The flag RB has a size of three bits×75, and indicates the number of bits (1 to 8) which have not been written, that is, which are blank or unfilled, in each respective byte of the data area.

The capacity of the FIFO 53 depends on the size of a relevant AC-L area and so forth. However, the capacity of the FIFO 53 is selected so that it can store code signals which overflow from an AC-L area (for example, 24 bytes). The FIFO 53 stores a flag EF in addition to data. The flag EF has a length of one bit and indicates whether or not data has been written in the FIFO 53. When the value of the flag EF is "0" (EF="0"), it indicates that data has been written to the FIFO 53. When the value of the flag EF is "1" (EF="1"), it indicates that the FIFO 53 is blank.

The RAMs and FIFOs in the circuit arrangements 45a ... 45e may be designated as RAM1 ... RAM5 and FIFO1 ... FIFO5, respectively. After the first step, the data areas of the RAMs may be as shown in FIG. 6. FIG. 18A is an enlarged view of an AC-H area positioned at the beginning of the RAM4 and an AC-L area for Y positioned thereafter. The AC-H area, five bits at the 10-th byte, and the 11-th and 12-th bytes of the AC-L area for Y are blank areas shown by shading. Thus, at the first to ninth bytes, the flags WF and RB are set to "1" and "0", respectively (WF=1 and RB=0). At the tenth byte, the flags WF and RB are set to "1" and "5", respectively (WF=1, and RB=5). At the 11-th and 12-th bytes, the flags WF and RB are set to "0" and "8", respectively (WF=0, and RB=8).

In a modified first step of a process for forming a sync block, AC component data are placed in AC-L areas until these areas become nearly full, rather than until they are filled completely. More specifically, if it is assumed that 16 bits is the maximum bit length of a variable length code, the data placing process halts when the remaining blank space of the AC-L areas is less than 16 bits. Thus, this modified process prevents one variable length code from being spread across more than one area.

In a second step, the flags WF, RB, and EF are supplied to the controller 56 which causes overflow data stored in the FIFO 53 to be placed in blank areas of the RAM 52 corresponding to fixed AC-H areas and variable AC-H areas of the sync block. More specifically, the controller 56 controls the barrel shifter 55 so as to bit-shift data from FIFO 53 to the data composing circuit 54, which combines the output of the barrel shifter 55 with data output from the sync block area of the RAM 52. The output from the data composing circuit 54 is written back to the sync block area of the RAM 52. In other words, the RAM 52 performs a "read after write" operation. The data read from the RAM 52 is also supplied to an input terminal a of the output selector 46.

In the second step, as shown in FIG. 18B, the AC-H components from the FIFO4 are placed in the AC-H area and the five bits of the 10-th byte of the AC-L area for Y.

After the second step, RAM1 ... RAM5 and FIFO1 ... FIFO5 have contents which are shown in FIG. 7. As previously discussed, the first and third sync blocks SYNC1 and SYNC3 have as yet unplaced code signals stored in the FIFO1 and the FIFO3. As a result, the flag EF, shown at the bottom of FIG. 7, is set to "0" (EF=0) for the first and third sync blocks. The second, fourth and fifth sync blocks SYNC2, SYNC4, and SYNC5, completely fit within the data areas of RAM2, RAM4 and RAM5, respectively, and so code signals are not stored in the FIFO2, FIFO4, and FIFO5. As a result, the flag EF is set to "1" (EF=1) for the second, fourth and fifth sync blocks. Furthermore, each of the second, fourth and fifth sync blocks SYNC2, SYNC4, and SYNC5 has unfilled areas, shown by shading in RAM2, RAM4, and RAM5.

After the second step, all of the data in each of the sync blocks stored in a respective RAM belongs to the same macro block.

In a third step, as yet unplaced data, namely, AC-H components, remaining in the FIFO 53 are placed in blank areas of another sync block. Through a bus 57 (FIG. 17) which connects the RAM, FIFO and controller of each of the circuit arrangements 45a to 45e, and which is under control of the controller 56, data is sent from one circuit arrangement to another. The as yet unplaced data may, for example, be fed into the FIFO of the next circuit arrangement having a RAM containing a data area with blank or unused space.

As shown in FIG. 18C, variable AC-H components from a FIFO other than FIFO4 are placed in six bits of the 11-th byte of the variable AC-H area for Y of the RAM4.

Thus, after the third step, approximately one encoded macro block of image data has been placed in each sync block.

The present invention can be applied to a standard resolution digital video or image signal as well as to a high resolution digital image signal; and to disc recording/ reproducing apparatus, or to apparatus for transferring digital image signals through a communication line, and so forth as well as to digital VTRs.

According to the present invention, since one sync block contains encoded data of an approximately integer number of macro blocks, in a variable speed reproducing mode or the like, data which is reproduced in the unit of one sync block can be effectively used.

In addition, according to the present invention, since AC-H areas are at predetermined positions and distributed within a sync block, the distance of a propagation error in AC-H components is reduced.

Moreover, according to the present invention, since a fixed AC-H area is followed by a first DC component, AC-H components which overflow from an AC-L area are placed at the beginning of a sync block. Thus, the probability that an AC-H component will need to be placed in another sync block is reduced.

Furthermore, according to the present invention, AC-H components which overflow from an AC-L area are placed beginning from a fixed AC-H area, so that the AC-H components have address information. As a result, even if a preceding sync block or data area has an error, the error can be refreshed in, or prevented from affecting, the next sync block or data area.

Also, since a macro block corresponding to central portions of an image is placed in the first sync block of a shuffling set, which is least affected by an error in another sync block of the shuffling set, errors in the reproduced image are less noticeable.

Although illustrative embodiments of the present invention, and various modifications thereof, have been described in detail herein with reference to the accompanying drawings, it is to be understood that the invention is not limited to those precise embodiments and the described modifications, and that various changes and further modifications may be effected therein by one skilled in the art without departing from the scope or spirit of the invention as defined in the appended claims.

What is claimed is:

1. A method for encoding a digital image signal, comprising the steps of:

orthogonally transforming said digital image signal into transformed macro blocks containing DC, low frequency AC and high frequency AC components of said digital image signal, encoding an encoding set comprised of a predetermined number of said transformed macro blocks using a variable length code into an amount of encoded data in accordance with a target amount, and forming said encoded data corresponding to an approximately integer number of said transformed macro blocks into a first sync block having a fixed length and also having DC component areas and low frequency AC component areas at predetermined positions and at least one high frequency AC component area at least at one predetermined position, with the encoded data representing said DC and low frequency AC components being in said DC and low frequency AC component areas, respectively, and at least some of the encoded data representing said high frequency AC components being placed in said at least one high frequency AC component area in the first sync block and remaining encoded data representing said high frequency AC components exceeding said fixed length being placed in a second sync block.

2. The method of claim 1; further comprising the steps of blocking said digital image signal into image data blocks, and shuffling a spatial sequence of said image data blocks before said step of orthogonally transforming.

3. The method of claim 2; wherein, a predetermined number of said image data blocks form a respective shuffling set of macro blocks, and, in said step of shuffling, central macro blocks of each said shuffling set which correspond to central portions of an image represented by said digital image signal are shuffled to precede other macro blocks of the respective shuffling set which correspond to other portions of said image that are less centrally located in said image than said central portions.

4. The method of claim 1; wherein said step of orthogonally transforming includes performing a discrete cosine transformation on said digital image signal to produce said transformed macro blocks.

5. The method of claim 1; wherein said step of encoding includes estimating a quantizing number for said encoding set based on said target amount, quantizing said macro blocks in said encoding set in accordance with said quantizing number, and variable length coding the quantized macro blocks using said variable length code.

6. The method of claim 1; wherein said first sync block also includes a data area having a starting position, and said at least one high frequency AC component area is located near said starting position of said data area.

7. A method for encoding a digital image signal, comprising the steps of:
orthogonally transforming said digital image signal into transformed macro blocks containing DC and low frequency AC components of said digital image signal;
encoding an encoding set comprised of a predetermined number of said transformed macro blocks using a variable length code into an amount of encoded data in accordance with a target amount, said transformed macro blocks being respectively comprised of a predetermined number of transformed image data blocks which each contain AC component data representing high frequency AC components and said low frequency AC components; and
forming said encoded data corresponding to an approximately integer number of said transformed macro blocks into a sync block having a fixed length and also having DC component areas and low frequency AC component areas at predetermined positions and at least one high frequency AC component area at least at one predetermined position, with the encoded data representing said DC and low frequency AC component being in said DC and low frequency AC component areas, respectively, and at least some of the encoded data representing said high frequency AC components being placed in the at least high frequency AC component area in said sync block, and with the number of said low frequency AC component areas in said sync block being equal to said predetermined number of transformed image data blocks in each of said transformed macro blocks, said step of forming including first placing AC component data of one of said transformed image data blocks in a transformed macro block into a respective one of said low frequency AC component areas until said respective one of said low frequency AC component areas is filled, next placing further AC Component data of said one of said transformed image data blocks which exceeds the capacity of said respective one of said low frequency AC component areas into said high frequency AC component area and unused areas of other of said low frequency AC component areas which contain AC component data for other of said transformed image data blocks, and finally placing as yet unplaced AC component data of said one of said transformed image data blocks into another sync block.

8. An apparatus for encoding a digital image signal, comprising:
means for orthogonally transforming said digital image signal into transformed macro blocks containing DC, low frequency AC and high frequency AC components of said digital image signal,
means for encoding an encoding set comprised of a predetermined number of said transformed macro blocks using a variable length code into an amount of encoded data in accordance with a target amount, and
framing means for forming said encoded data corresponding to an approximately integer number of said transformed macro blocks into a first sync block having a fixed length and also having DC component areas and low frequency AC component areas at predetermined positions and at least one high frequency AC component area at least at one predetermined position, with the encoded data representing said DC and low frequency AC components being in said DC and low frequency AC component areas, respectively, and at least some of the encoded data representing said high frequency AC components being placed in said at least one high frequency AC component area in the first sync block and remaining encoded data representing said high frequency AC components exceeding said fixed length being placed in a second sync block.

9. The apparatus of claim 8; further comprising means for blocking said digital image signal into image data blocks, and means for shuffling a spatial sequence of said image data blocks before said image data blocks are orthogonally transformed.

10. The apparatus of claim 9; wherein a predetermined number of said image data blocks form a respective shuffling set of macro blocks, and said means for shuffling shuffles central macro blocks of each said shuffling set which correspond to central portions of an image represented by said digital image signal to precede other macro blocks of said shuffling set which correspond to other portions of said image that are less centrally located in said image than said central portions.

11. The apparatus of claim 8; wherein said means for orthogonally transforming performs a discrete cosine transformation on said digital image signal to produce said transformed macro blocks.

12. The apparatus of claim 8; wherein said means for encoding includes means for estimating a quantizing number for said encoding set based on said target amount, means for quantizing said macro blocks in said encoding set in accordance with said quantizing number, and means for variable length coding the quantized macro blocks using said variable length code.

13. The apparatus of claim 8; wherein said first sync block also includes a data area having a starting position, and said at least one high frequency AC component area is located near said starting position of said data area.

14. An apparatus for encoding a digital image signal, comprising:

means for orthogonally transforming said digital image signal into transformed macro blocks containing DC and low frequency AC components of said digital image signal;

means for encoding an encoding set comprised of a predetermined number of said transformed macro blocks using a variable length code into an amount of encoded data in accordance with a target amount, said transformed macro blocks being respectively comprised of a predetermined number of transformed image data blocks which each contain AC component data representing high frequency AC components and said low frequency AC components; and framing means for forming said encoded data corresponding to an approximately integer number of said transformed macro blocks into a sync block having a fixed length and also having DC component areas and low frequency AC component areas at predetermined positions and at least one high frequency AC component area at least at one predetermined position, with the encoded data representing said DC and low frequency Ac components being in said DC and low frequency AC component areas, respectively, and at least some of the encoded data representing said high frequency AC components being placed in the at least high frequency AC component area in said sync block, and with the number of said low frequency AC component areas in said sync block being equal to said predetermined number of transformed image data blocks in each of said transformed macro blocks, said framing means including first means for placing AC component data of one of said transformed image data blocks in a transformed macro block into a respective one of said low frequency AC component areas until said respective one of said low frequency AC component areas is filled, second means for placing further AC component data of said one of said transformed image data blocks which exceeds the capacity of said respective one of said low frequency AC component areas into said high frequency AC component area and unused areas of other of said low frequency AC component areas which contain AC component data for other of said transformed image data blocks, and third means for placing as yet unplaced AC component data of said one of said transformed image data blocks into another sync block.

* * * * *